United States Patent [19]

Schwengers et al.

[11] 4,154,623

[45] May 15, 1979

[54] METHOD OF PREPARING REFINED STARCH HYDROLYSATES FROM STARCH-CONTAINING CEREALS

[75] Inventors: Dieter Schwengers, Dormagen, Fed. Rep. of Germany; Cornelis Bos, Allerod; Erik Andersen, Kastrup, both of Denmark

[73] Assignees: DDS-Kroyer A/S, Copenhagen, Denmark; Pfeifer & Langen, Cologne, Fed. Rep. of Germany

[21] Appl. No.: 871,643

[22] Filed: Jan. 23, 1978

[30] Foreign Application Priority Data

Jan. 24, 1977 [GB] United Kingdom ................ 2767/77

[51] Int. Cl.² .............................................. C13L 1/02
[52] U.S. Cl. ...................................... 127/39; 127/67; 127/68; 127/71; 195/31 R; 260/112 G
[58] Field of Search ........................ 127/39, 67, 68, 71

[56] References Cited

U.S. PATENT DOCUMENTS 2,368,668  2/1945  Langford ............................... 127/68
2,442,789  6/1948  Walsh ................................ 127/39 X
3,857,987  12/1974  Rogols ............................... 127/68 X

OTHER PUBLICATIONS

R. L. Slotter et al., Ind. Eng. Chem., 36, 404–408 (1944).

Primary Examiner—Sidney Marantz
Attorney, Agent, or Firm—Watson, Cole, Grindle & Watson

[57] ABSTRACT

A process of preparing a starch hydrolysate from wheat, barley or rye comprising the steps of contacting kernels of wheat, barley or rye with an aqueous solution to hydrate and soften the kernels, gently wet-milling the hydrated and softened kernels, separating fibres and pentosans attached thereto as well as germs and gluten from the wet-milled product to form a starch-containing slurry essentially free of insoluble pentosans, carefully washing the fraction to form a refined, starch-containing product, hydrolysing the refined product to form a starch hydrolysate and finally refining the hydrolysate.

9 Claims, 1 Drawing Figure

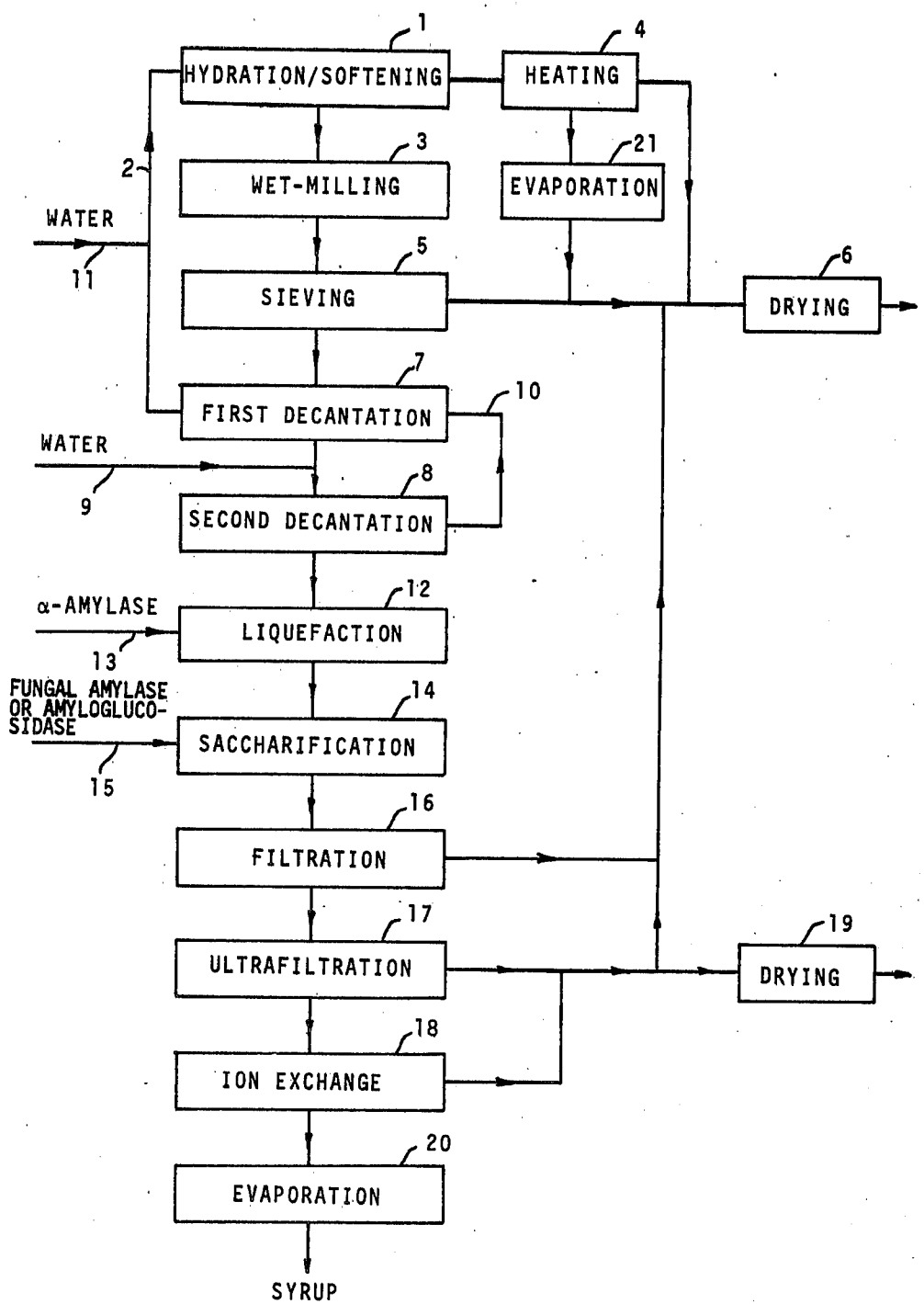

METHOD OF PREPARING REFINED STARCH HYDROLYSATES FROM STARCH-CONTAINING CEREALS

BACKGROUND OF THE INVENTION

This invention relates to a method of preparing refined starch hydrolysates from starch-containing cereals.

The term "starch-containing cereals" is herein to be understood as comprising wheat, barley and rye.

The starting material ordinarily used in the production of starch hydrolysates is refined maize starch. Refined maize starch is produced by steeping maize kernels in steeping water containing about 0.2% $SO_2$ and subsequently wet-milling the steeped product so as to effect a release of the starch granules. The starch is subsequently separated from proteins, germs and fibres on high speed centrifuges, hydrocyclones, screens or filters.

The refined maize starch thus produced is then hydrolyzed so as to form a hydrolysate mainly consisting of dextrose. The hydrolysis may be catalyzed by an acid or by enzymes or by a combination of acid and enzymes.

Finally, the hydrolysate is refined by filtration and/or by treatment with an ion exchanger material or activated carbon.

The use of cereals as starch-containing starting material presents some problems which are not met in the ordinary maize starch hydrolysis.

Like maize, wheat, barley and rye contain other carbohydrates than starch, such as pentosans, which are present in wheat, barley and rye in an amount of from 1.5 to 3% by weight. However, whereas the pentosans present in maize are insoluble and remain insoluble during the hydrolysis and consequently can be easily removed from the starch hydrolysate, the pentosans contained in wheat, barley and rye tend to be solubilized when heated in the presence of water and create serious problems during the further processing of the hydrolysate.

Thus, due to the relatively low molecular size of the solubilized pentosans it is difficult to separate these pentosans from the starch hydrolysate produced. On the other hand they cannot be allowed to remain in the starch hydrolysate to be refined, because of their adverse effect on the filtration rate of the ultrafiltration process and/or the energy consumption of such a process. Furthermore, the presence of solubilized pentosans in an ultrafiltration permeate makes the concentration of the permeate difficult. Thus, if the permeate contains pentosans in a concentration of 10–12% by weight, the permeate tends to be converted into a gel when being concentrated.

In order to eliminate the problems caused by the pentosans, it has been proposed (F. J. Simpson, Canadian Journal of Technology, 33, 33–40, 1955) to hydrolyze pentosans present in starch slurries prepared from wheat flour by using pentosanases from specific Bacillus strains.

This solution has not been successful, because it is based on use of flour, i.e. a finely milled product, and because the milling operation results in the formation of so-called "B- Starch", i.e. starch which is very difficult or even impossible to convert into a hydrolysate.

The present invention is based on the surprising discovery that the pentosans contained in wheat, barley and rye are closely attached to the fine fibres of such cereals, and that these fibres and the pentosans attached thereto can be separated from the starch-containing product, provided the starting material is hydrated and softened and subsequently wet-milled in a gentle manner.

Furthermore, it has been found that if the starch-containing product obtained after separation of fibres and pentosans attached thereto as well as germs and gluten from the hydrated and softened and subsequently wet-milled starting material is carefully washed with water, soluble pentosans, if any, can be removed therefrom so as to obtain a refined starch product essentially free of pentosans.

SUMMARY OF THE INVENTION

The method of the invention thus comprises the steps of subjecting cereal kernels to a treatment with an aqueous solution for a time sufficient to effect a hydration and softening of the kernels, gently wet-milling the hydrated and softened kernels in a manner so as to avoid the release of pentosans from the fibres of the kernels, separating the fibres and the pentosans attached thereto as well as germs and gluten from the wet-milled product to form a starch-containing fraction which is essentially free of insoluble pentosans, carefully washing the starch-containing fraction with an aqueous solution to remove soluble components therefrom, subsequently hydrolyzing the refined starch-containing fraction and finally refining the hydrolysate formed.

The hydration and softening of the cereal kernels is preferably carried out with water at a temperature of about 50° C., e.g. within the range of from 40° to 55° C.

During the hydration and softening steps the kernels swell. Ordinarily about 80% of the kernels have become swollen after 2–3 hours. However, in order to obtain a complete hydration and softening of the kernels, the latter are maintained in contact with the water for a period of from 5 to 15 hours.

The hydration and softening of the cereal kernels differs from the steeping process which is ordinarily used in the production of starch hydrolysates from maize kernels. Thus, a steeping process serves to extract water soluble components from the maize kernels and to leave the latter intact. Contrary thereto, the hydration and softening of the cereal kernels result in an extraction of only 1–2% by weight of solubles.

Furthermore, a steeping process which is based on the use of $SO_2$ to disintegrate the gluten lattice has to be continued for a sufficiently long time, viz. from 24 to 60 hours, to initiate a strong lactic acid production in order to obtain a high yield of starch. The hydration and softening of the kernels with water is preferably carried out countercurrently. Such a countercurrent hydration and softening may be carried out in a so-called diffuser wherein the kernels are contacted with water in shallow layers while being transported from one end of the diffuser towards the opposite end. The use of such a diffuser ensures that disintegration of the swollen kernels is essentially eliminated and that all kernels are subjected to the influence of water for essentially the same period. By avoiding disintegration of the swollen kernels, the extraction of solubles is maintained at a relatively low level.

A particularly suitable diffuser comprises a slightly inclined elongated trough containing one or more screw conveyors for transporting solid material from the lower end of the trough towards the upper end thereof countercurrently with water introduced at the upper end of the trough and discharged at its lower end. Such a diffuser (DDS-type) is manufactured by Aktieselskabet De Danske Sukkerfabrikker, Denmark. The retention time of the cereal kernels in such a diffuser is preferably about 6 hours.

As mentioned above, the wet-milling of the hydrated and softened kernels should be effected gently in order to avoid that the pentosans are released from the fibres of said kernels.

If the milling is too severe, the pentosans are solubilized and cannot be separated from the starch fraction. Thus, the pentosans are found in the starch hydrolysate, and the problems discussed above will be encountered.

The wet-milling of the hydrated and softened kernels may be effected in mills which are well known per se.

Following the wet-milling of the hydrated and softened kernels, the fibres and the non-dissolved pentosans attached thereto as well as germs and gluten which have been released from the kernels during the pretreatment discussed are separated so as to form a starch-containing product which is essentially free of insoluble pentosans. The separation is preferably effected by sieving, e.g. by using a screen having a mesh size of about 350 microns.

The separated material is preferably dried so as to form a by-product having a high nutritional value.

Following the separation of fibres, insoluble pentosans, germs and gluten, the starch slurry formed is carefully washed to remove soluble components such as solubilized pentosans, if any, ash, proteins, including gluten and amino acids.

The washing may be carried out on a decanter and preferably as a two step process, wherein fresh water is added after the first washing step and the wash water from the second washing step is recycled to the first step. The wash water from the first washing step may be recycled and used in the hydration and softening step described above.

The washed starch slurry is then hydrolyzed in a manner which is well known per se. The hydrolysis preferably comprises an acid or enzymatic liquefaction or a combined acid and enzymatic liquefaction followed by a saccharification.

When subjecting the starch slurry to an enzymatic liquefaction, the slurry is heated to a temperature of between 80° and 120° C., and a liquefaction enzyme such as α-amylase is added. The temperature selected depends on the type of α-amylase used.

The liquefied product thus formed is then saccharified, preferably enzymatically.

The selection of saccharification enzyme(s) depends on the desired final product. Thus, saccharification with fungal amylase results in a syrup having a high maltose content, whereas a syrup having a high dextrose content is obtained by using amyloglucosidase as saccharification enzyme. The saccharification is preferably effected at a temperature of between 50° and 60° C.

Subsequent to the saccharification the insoluble gluten may be removed from the hydrolysate formed. The separation of gluten is preferably effected in a decanter. The solid phase thus obtained may be dried so as to form a product having a high nutritional value.

Ordinarily, the hydrolysate obtained in this manner contains 2–4% by weight of proteins based on the weight of solids and a major proportion of said proteins are colloidal i.e. having a particle size of less than 0.3 micron.

The major part of the proteins is subsequently separated from the hydrolysate, e.g. by ultrafiltration. By subjecting the hydrolysate to ultrafiltration, 80 to 90% by weight of the proteins can be removed therefrom.

The proteins separated by said ultrafiltration are preferably dried so as to form a dry product having a high protein concentration. The proteins recovered may also be added to the fraction containing fibres, pentosans, germs and gluten separated from the wet-milled product, before said fraction is dried.

The permeate obtained by the ultrafiltration may contain soluble proteins, e.g. from 0.1 to 0.6% by weight and ash, e.g. from 0.1 to 0.3% by weight based on dry sugar.

Therefore, the permeate is preferably further refined. Thus, the permeate may be contacted with activated carbon or an ion exchanger material.

The refined hydrolysate thus obtained may be further processed so as to form maltose and/or dextrose syrups, dextrose monohydrate, total sugar or high fructose syrups.

Surprisingly, it has been found that up to 90% of the starch contained in the wheat kernels can be converted into sugar by using the method of the invention, whereas only 74–76% of the starch are converted in the processes which have been used hitherto. Thus, whereas about 2.2 tons of wheat are required to produce 1 ton of sugar by a commonly used process, only 1.75 tons of wheat are required to form the same amount of sugar by the method of the invention.

Also the water consumption is considerably lower when using the method of the invention. Thus, only 1.5 $m^3$ of water is required to process 1 ton of wheat when using the method of the invention, whereas about 8 $m^3$ are required in a traditionel process.

In the embodiments described above, the proteins are separated after the completion of the hydrolysis. However, it is also possible to separate the proteins from the liquefied product e.g. by ultrafiltration.

If the separation of proteins is effected prior to the saccharification, the saccharified product may be subjected to an additional ultrafiltration immediately following the saccharification step. This embodiment of the method of the invention presents the advantage that the refining step is facilitated. Thus, be removing the proteins prior to saccharification it is prevented that the proteins be solubilized or converted into colloids during saccharification.

DESCRIPTION OF THE PREFERRED EMBODIMENTS

In the drawing 1 is a DDS type diffuser in which cereal kernels are countercurrently treated with water supplied to the diffuser 1 through a pipe 2. The hydrated and softened kernels are transferred to a wet-mill 3, whereas the water containing ash, soluble proteins and soluble pentosans are introduced into a boiler 4 in which it is boiled for 1–5 minutes.

The wet-milled starch-containing material in the form of a slurry is introduced onto a screen 5 in order to remove fibres with pentosans attached thereto, germs and gluten.

The separated material is introduced into a drier 6, whereas the slurry is transferred to a first decanter 7 and subsequently to a second decanter 8. Water is added via a pipe 9 after the first decantation and decantation water from the second decanter 8 is recycled to the first decanter 7 through a pipe 10. Water from the first decanter 7 is recycled to the diffuser 1 through the pipe 2. Fresh water is introduced into the pipe 2 via a pipe 11.

The starch slurry obtained in the second decanter 8 is introduced into a jet cooker 12 in which it is heated to a temperature of about 85° C. Bacterial α-amylase is introduced into the jet cooker 12 via a pipe 13.

The liquefied product is transferred to a saccharification tank 14 and fungal amylase or amyloglucosidase is introduced therein via a pipe 15. The temperatur of the saccharification tank 14 is maintained at about 60° C.

The saccharified product is introduced onto a filter 16 to form a filtrate which is introduced into an ultrafiltration apparatus 17 and a gluten fraction which is mixed with the solid fraction formed on the screen 5.

The permeate obtained in the ultrafiltration apparatus 17 is introduced into an ion exchanger column 18, whereas the concentrate is either mixed with the fractions formed on the screen 5 and filter 16 or dried in a drier 19.

After having passed the ion exchanger column 18, the refined hydrolysate is introduced into a boiler 20 in which it is concentrated to form a syrup which can be further processed. The effluent from the ion exchanger column 18 may be mixed with the concentrate from the ultrafiltration apparatus 17. When boiling the hydration water from the diffuser 1, the majority of the proteins and part of the pentosans precipitate. The precipitate is separated from the supernatant liquor and is mixed with the fractions formed on the screen 5 and the filter 16. The supernatant liquor is transferred to an evaporator 21 in which it is concentrated. The concentrate is also mixed with the fractions formed on the screen 5 and filter 16.

The invention will be described in further detail with reference to the following examples.

EXAMPLE 1

10 kg wheat kernels were introduced into a DDS type diffuser. Water at a temperature of 50°-55° C. containing 0.2% $SO_2$ w/w was passed countercurrently with a flow of wheat kernels through the diffuser. The total retention time in the equipment was 8 hours. The process water used for the hydration softened the wheat kernels and minor quantities of solubles were extracted from the wheat.

The ratio (on weight basis) of wheat kernels to water was 1:2.

The wheat kernels absorbed during a period of 2 hours their own weight of water, and their volume was doubled.

The hydrated and softened kernels were passed through a coarse type tooth disc mill which fully disintegrated the kernels thus releasing starch, gluten, germ and fibres.

The milk slurry containing starch, gluten, fibre, germ and solubles were passed over a screen, e.g. DSM type screen, so as to remove a fraction containing fibres and germs. The fraction was dried and processed into a cake. The crude starch/gluten slurry was passed through a centrifuge of the decanter type, whereby the slurry was concentrated and countercurrently washed with fresh water to reduce the content of soluble ash and soluble organic material. The supernatant liquid was recycled to the hydration and softening step. The concentration of the partly refined slurry was adjusted to 30% dry substance based on starch and the slurry was liquefied by means of bacterial α-amylase in a jet cooker at 85° C. After liquefaction, the temperature of the slurry was adjusted to 60° C., and the pH was adjusted to 4.8. Amyloglucosidase enzyme was added and the product obtained was saccharified for about 72 hours. The saccharified hydrolysate was passed through a decanter so as to remove the insoluble gluten fraction. The gluten fraction was sweetened off with fresh water. The hydrolysate from the decanter consisted of sugars and mainly colloidal proteins which are capable of passing through 0.1–0.3 micron pore openings, e.g. through a micropore filter.

The hydrolysate was refined in an ultrafiltration apparatus. The colloidal material was fully retained by the ultrafiltration diaphragms. The resultant hydrolysate (permeate) from the ultrafiltration apparatus was water-clear and was further refined by conventional ion-exchange treatment.

The permeate contained approx. 0.3% ash and 0.5% soluble proteins on dry sugar basis.

The concentrated hydration liquid, the fibres and germs from the DSM screens, the protein fraction from the decanters and the concentrate from the ultrafiltration apparatus were mixed together and dried to produce a high quality animal feed raw material.

The following table shows the dry substance balance up to the final refining of the hydrolysate.

TABLE

| | Basis: 1000 g wheat kernels (12% moisture) | | |
|---|---|---|---|
| Component | Wheat g | Partly refined hydrolysate, g | Feed material g |
| Starch and starch hydrolysates | 651.00 | 653.00 | 57.00 |
| Protein | 81.0 | 3.25 | 77.75 |
| Ash | 16.00 | 1.95 | 14.05 |
| Fat | 17.00 | | 17.00 |
| Pentosans | 45.00 | | 45.00 |
| Crude fibre | 28.0 | | 28.0 |
| Others | 42.0 | | 32.0 |
| Total dry solid | 880.00 | 658.20 | 270.80 |
| Water | 120.00 | | |
| Total | 1000.00 | | |

EXAMPLE 2

250 g rye - type Caro-Kurz - (216 g dry substance containing 135 g starch) were soaked for 8 hours at 50° C. in 750 g water to which 0.4 g $NaHSO_3$ had been added. After soaking, the rye kernels were gently wet-milled with water at a concentration of 15% dry substance so as to avoid disintegration of the fibres. The fibres were removed by sieving and the insolubles (starch/protein) separated by centrifugation. The concentration of the cleared solution which contained 1.5% dry substance was adjusted at 0.5% dry substance and the viscosity measured at 25° C. It was 1,778. The concentration of pentosans in the cleared solution was 12.1% dry substance.

The starch/protein mixture separated by centrifugation was liquefied with alpha-amylase and subsequently saccharified with amyloglucosidase and the insoluble proteins were removed by centrifugation. The glucose solution which was cloudy with colloidal material was converted into a completely clear glucose solution by ultrafiltration (diaphragm UF-CA-10 from Kalle, Wiesbaden, Germany). The concentrate obtained by ultrafiltration was pumped through the ultrafiltration module until it contained less than 1% glucose. The concentrate had at that time a low viscosity and did not block the ultrafiltration module.

EXAMPLE 3

500 g barley - feed type barley - (440 g dry substance containing 317 g starch) were softened for 6 hrs. at 50° C. in 1500 g water containing 0.1% w/w $SO_2$. After softening the kernels were wet-milled with water at a concentration of 12% dry substance, to avoid extensive disintegration of the fibres. The fibres were separated by means of a 350 μm screen and the insolubles passing through the screens and consisting mainly of starch and proteins were separated by centrifugation. The supernatant liquor from the centrifuging step contained 1.3% dry substance. The solution was cleared by filtration and the concentration adjusted to 0.5% dry substance. The viscosity was measured at 25° C., the viscosity was 1,326 (water = 1,000). The concentration of pentosans in the cleared solution was 8.75% on dry substance. The starch/protein mixture separated by centrifugation was liquefied with alphaamylase and subsequently saccharified with amyloglucosidase and the insoluble proteins were removed by centrifugation. The glucose solution which contained colloidal material was converted into a completely clear glucose solution by ultrafiltration (diaphragm UF-CA-10 from Kalle, Wiesbaden, Germany). The concentrate obtained by ultrafiltration was pumped through the ultrafiltration module it contained less than 1% glucose. The concentrate had at that time a low viscosity and did not block the ultrafiltration module.

We claim:

1. A method of preparing refined starch hydrolysates from kernels of a cereal selected from the group consisting of wheat, barley and rye, consisting essentially of the steps of hydrating and softening the kernels with an aqueous solution for a period of from 5 to 15 hours at a temperature within the range 40°-60° C., gently milling the hydrated and softened kernels so as to avoid the release of pentosans from the fibres of said kernels, separating the fibres and pentosans attached thereto from the wet-milled product to form a starch fraction and a fibre fraction, washing the starch fraction with an aqueous medium to remove soluble components therefrom, hydrolyzing the starch fraction thus obtained to form a hydrolysate and refining the partially or wholly hydrolized product to remove gluten.

2. The method as claimed in claim 1, wherein the step of separating fibres and pentosans is effected by sieving.

3. The method as claimed in claim 1, wherein the step of washing of the starch-containing fraction is effected by decantation.

4. The method as claim in claim 1, wherein the starch-containing fraction is washed twice.

5. The method as claimed in claim 1, wherein said kernels of cereal are wheat kernels.

6. The method as claimed in claim 1, wherein the step of hydrating and softening of the cereal kernels is carried out countercurrently.

7. The method as claimed in claim 6, wherein the step of hydrating and softening of the cereal kernels is effected in a diffuser.

8. The method as clained in claim 1, wherein said aqueous solution contains $SO_2$.

9. The method as claimed in claim 8, wherein said aqueous solution contains between 0.1% and 0.2% $SO_2$.

* * * * *